July 18, 1961

M. SAMS ET AL 2,993,190

ELECTRICAL TERMINAL

Filed July 7, 1958

INVENTORS
MARTIN SAMS
HERMAN FELDMAN

BY James and Franklin

ATTORNEYS

July 18, 1961

M. SAMS ET AL 2,993,190

ELECTRICAL TERMINAL

Filed July 7, 1958

INVENTOR.
MARTIN SAMS
HERMAN FELDMAN
BY

ATTORNEYS

United States Patent Office 2,993,190
Patented July 18, 1961

2,993,190
ELECTRICAL TERMINAL
Martin Sams, 7635 Byron Ave., Miami Beach 41, Fla., and Herman Feldman, 9117 Carlyle Ave., Surfside 54, Fla.
Filed July 7, 1958, Ser. No. 747,027
18 Claims. (Cl. 339—100)

The present invention relates to electric terminals, and more particularly to that part thereof which receives and makes electrical connection with an external lead. It relates more specifically to a mode of construction which facilitates the securing of the wire in place and the attainment of electrical connection thereto.

The terminal of the present invention is especially adapted for use with stiff core (i.e. solid core and stiff cable-like stranded core) insulated wire, but is not necessarily limited to use therewith. In the past it has usually been deemed necessary, before such a stiff core wire or, indeed, almost any wire, could be connected to a terminal, that the insulation be stripped therefrom so as to bare an appropriate portion thereof. There are, of course, certain obvious drawbacks to this procedure. It is usually very time consuming, because the insulation is comparatively tough and resists tearing. It requires an appreciable degree of skill if the wire is not to be damaged by the stripping operation. And even if the wire is not damaged appreciably it is very likely to become nicked or scarred. This is undesirable because it involves the removal of some of the conducting material from the wire and because it sets up fault lines in the wire which may cause mechanical failure, particularly in a core which is subject to vibration. In order to obviate these difficulties various tools have been designed for stripping the insulation from the wire. Not only are these tools often expensive and relatively heavy, but unless great care is exercised in their use they will cut rings on the wire thus setting up the aforementioned fault lines, and the wire will therefore be subject to breakage.

Despite these disadvantages, insulation stripping is a prerequisite to the use of the terminals for stiff core wires presently available. (The only exception to this statement are those terminals where the insulation and core are actually cut into and penetrated, but such terminals have a fairly limited range of applicability.) A prime characteristic of the terminals of the present invention, however, resides in the fact that, while they can be used with stripped wire if desired, they are particularly effective with unstripped wire, thus eliminating the necessity that insulation be stripped from the wire in a separate operation. Instead the terminal of the present invention, according to one important aspect thereof, is so constructed that when the insulated wire is inserted into the terminal a firm, effective and permanent electrical connection will be accomplished merely by the act of insertion.

The terminals of the present invention will make at least as good an electrical connection as conventional terminals, and usually a better one, they can be used for more than one gauge of wire if desired, and they are competitive in both physical size and cost with corresponding conventional terminals.

In our application Ser. No. 684,544, filed September 17, 1957, and entitled "Electrical Terminal," a novel type of terminal is disclosed which avails itself of the fact that stiff core insulated electric wire of the type available on the market today has an insulation sheath which is easily compressible and which slides rather freely along the core. That type of terminal is provided with means adapted, as the covered wire is inserted into the terminal, to engage the insulation sheath but leave the wire core relatively free to move. When the wire is pushed further into the terminal the restraint exerted substantially only on the sheath will cause the core to protrude from the sheath at the end of the wire. Means are provided to hold the wire in position and to make electrical connection with the protruding core portion. Included in the operative structure is a prong which enters the wire endwise between the conductive core and the insulation sheath.

The structure here disclosed constitutes a modification of, and in some respects an improvement over, the structures disclosed and claimed in the aforementioned application Ser. No. 684,544. In particular the structure here disclosed and claimed may be used in a more facile manner by those desiring to connect electrical wires to the terminal.

In the terminal of our aforementioned copending application the tip of the prong is rendered visible so that the user of the terminal can properly align the wire with the prong at the time of insertion of the wire. This presupposes a certain minimal amount of manual dexterity and visual acuity on the part of the user which may in certain instances, as in the case of householders, not be present to a sufficient degree, and which it may in any event be very difficult effectively to exert if the terminal is located relatively inaccessibly. The structure of the present invention, however, eliminates the need for visual access to the terminal and virtually eliminates the need for any manual dexterity whatsoever. All that is necessary is to insert the wire into the terminal far enough so that it will not pull out, and such insertion may be effectively accomplished solely by the sense of touch, and without any visual observation.

In our aforementioned copending application the desirability that the prong be mounted resiliently is pointed out. While this type of mounting is desirable and even necessary in certain instances, such as where the terminal is adapted to receive at least three sizes of wire, we have found that it is not essential when the terminal is to receive one size wire or two closely similar size wires, and that the elimination of the resilient mounting of the prong in such an application gives rise to even additional sturdiness, reliability and inexpensiveness of construction when compared with the previous embodiments. The rigid mounting of the prong in accordance with the teachings of the present invention permits the tooth which grasps and retains the bared end of the wire to press that wire against a rigid backing, thereby achieving excellent electrical contact with the wire. Also, because the rigidly supported prong is usually shorter than the resiliently supported prong it is sturdier and hence less susceptible to breakage or distortion.

In the embodiments described in our aforementioned co-pending application in which the prong is resiliently mounted, it is necessary that a floor be provided beneath the prong against which the lower surface of the wire insulation is pressed when the wire is engaged by the retaining tooth. Since in the embodiments here disclosed the wire is bitten by the tooth on the rigid base instead of on the prong itself, the tooth no longer exerts a force on the prong which would tend to bend it down. As a result, no such rigid floor need be provided beneath the prong. All that is necessary is that there be a clearance beneath the prong into which the wire insulation may be received, which clearance may well be, and preferably is considerably larger than necessary for reception of that insulation.

In order to provide for guided insertion of the wire into the terminal of the present invention the front wall of the terminal is provided with an elongated opening or collar with which the tip of the prong registers, the prong tip being spaced above the lower surface of the opening by a distance comparable to the thickness of the insulation on the wire to be used therewith. In a single gauge terminal, the prong tip may be spaced above the lower surface of the opening a distance which is comparable to or slightly greater than the thickness of the insulation of the wire to be used. In a two gauge terminal, however, the prong tip distance above the lower surface of the opening should be slightly greater than the thickness of the wire's insulation. This is necessary in order to prevent the fully insulated smaller wire from going completely over the prong. The size of the opening is such as to freely but snugly admit the largest size wire with which the terminal is to be used, and its length is such as to ensure that when a somewhat smaller size wire is inserted therein the maximum misalignment between the wire and the axis of the opening is maintained sufficiently small so that the end of the wire will be certain to engage with the prong tip in such a way that the prong will properly enter between the wire core and the insulation sheath. Hence the possibility that the wire can miss the tip of the prong is eliminated.

The terminals of the present invention are nevertheless characterized by the advantages of the terminals described in our aforementioned copending application, to wit, wire stripping and screw driver manipulation are no longer required, the terminals are comparable in cost to prior art terminals but require less space, perfect electrical contact is always achieved and that contact is superior to that achieved in many competitive terminals, no live parts are exposed, the electrical connection is vibration- and jostle-proof, and the deleterious effects of corrosion are minimized.

To the accomplishment of the above, and to such other objects as may hereinafter appear, the present invention relates to the construction of an electrical terminal defined in the appended claims and as described in this specification, taken together with the accompanying drawings, in which:

Figure 1:
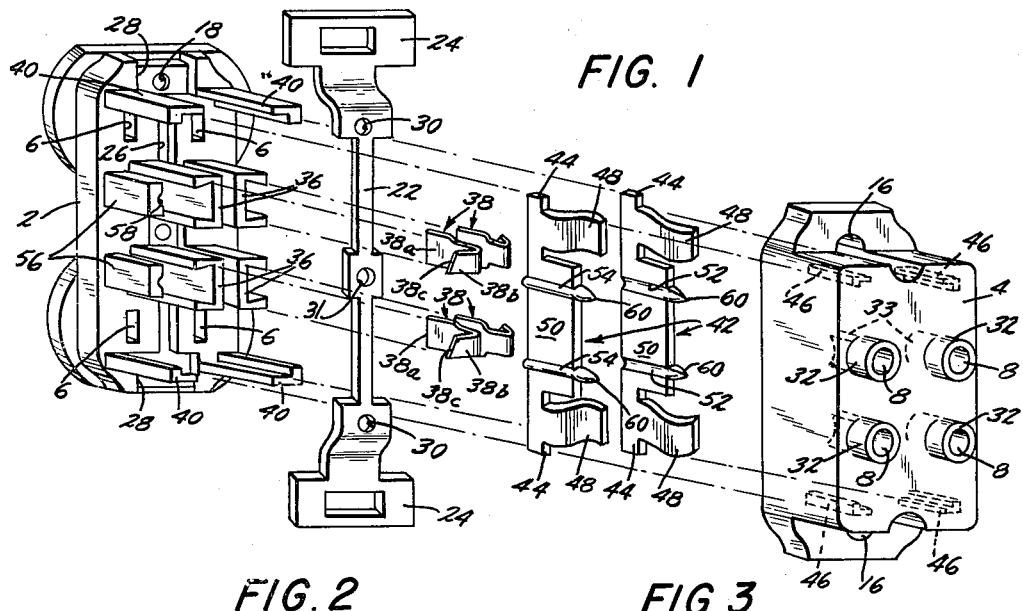
FIG. 1 is a three-quarter perspective exploded view of a representative plug-in receptacle embodying terminals in accordance with the present invention.
Figure 2:
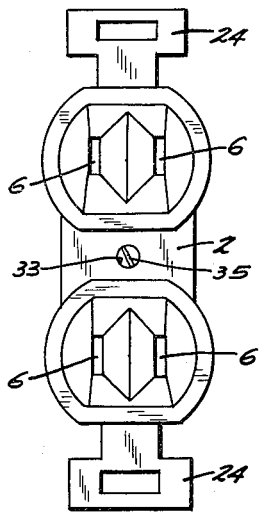
FIG. 2 is a front elevational view thereof.
Figure 3:
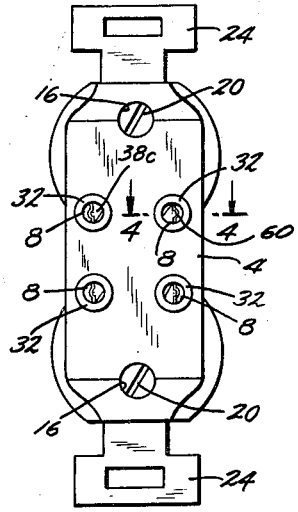
FIG. 3 is a rear elevational view thereof.
Figure 4:
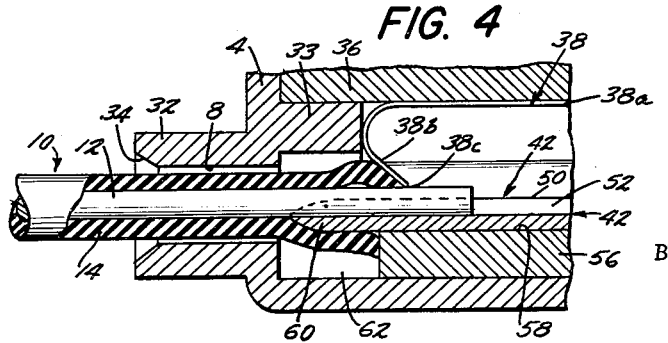
FIG. 4 is a cross sectional view, on an enlarged scale, showing one of the terminals with a wire in place therein.

In the embodiment of FIGS. 1–4, which illustrates a representative wall plug receptacle embodying the principles of the terminal of the present invention, the housing is defined by a front member 2 and a rear member 4. The front member 2 is provided with elongated openings 6 through which the prongs of a conventional plug are adapted to pass. The rear member 4 is hollow and is provided with a plurality of apertures 8 through which wires 10 are adapted to be inserted, those wires comprising a comparatively stiff conductive core 12 covered by an insulating sheath 14 which is usually of rubbery material and therefore is somewhat resiliently compressible. In wires of this type available on the market the insulating sheath 14 is not bonded to the conductive core 12, but is instead readily axially slidable relative thereto. Screw holes 16 are provided in the rear member 4 adapted to register with tapped holes 18 in the front member 2 so that screws 20 can retain the two members 2 and 4 in assembled condition. A mounting strip 22 is secured between the members 2 and 4 and has end portions 24 extending from either end of the receptacle assembly so that the receptacle may be mounted in position thereby. Recesses 26 and 28 are provided on the inner face of the member 2 within which the mounting strip 22 is received, the screws 20 passing through apertures 30 therein, and the central portion of the mounting strip is provided with a threaded screw hole 31 registering with a corresponding aperture 33 in the front member 2 through which screw 35 is adapted to pass. The wire-received apertures 8 are formed in part by means of collars or rings 32 which extend outwardly from the member 4, and inwardly extending curved walls 33 may also be provided. The outer ends of the apertures 8 may be bevelled, as at 34.

Projecting from the inner surface of the front member 2 are a plurality of channel-shaped elements 36 within which wire-gripping teeth generally designated 38 are adapted to be received, those teeth comprising portions 38a snugly received within the channels 36 and integral and reversely bent portions 38b terminated in skewed wire-engaging edges 38c.

Also projecting from the inner face of the front member 2 are posts 40 within which the terminal strips generally designated 42 are adapted to be received. These terminal strips 42 are formed of suitable conducting material. They comprise end portions 44 adapted to be received inside the posts 40 and retained in position by means of projections 46 on the rear member 4 when the members 2 and 4 are assembled, thus serving to mount the strips 42 in position slightly to one side of the elongated openings 6. The strips 42 carry broad resilient blades 48 located in line with the openings and adapted to make electrical connection with the prongs of the plugs adapted to be inserted into the terminals. They also comprise body portions 50 the inner surfaces of which are preferably channeled at 52 on their inner surfaces, their outer surfaces being convex, as at 54. These body portions 50 are supported by posts 56 projecting from the inner face of the front member 2, those posts being channeled at 58 so as to receive the convex portions 54 of the terminal strips 42. Extending forwardly from the body portions 50 in line with the channels 52 are comparatively short prongs 60 the inner surfaces of which are concave so as to constitute prolongations of the channels 52. The tips of the prongs 60 register with corresponding openings 8 and, as may best be seen from FIG. 4, terminate rearwardly (inside the housing) of the inner end of the corresponding aperture 8. The posts 56 terminate short of the inner end of the corresponding opening 8 so as to produce a large clearance 62 beneath the prong 60 and inwardly of the openings 8.

To insert a wire into the wall plug receptacle of FIGS. 1–4 so as to make electrical connection with one of the terminals therein, all that is required is to push the wire through the opening 8. The tip of the wire will engage the tip of the prong 60, which latter, because of its short length, and because of the rigid mounting of the body portion 50 of the terminal strip 42 by means of the posts 56, will be rigidly positioned. The prong 60 will enter between the wire core 12 and the insulation sheath 14. As the wire is further inserted the tooth portion 38b will be engaged by the wire and swing upwardly and inwardly, and the tip of the insulation sheath 14 will engage the post 56 as well as the tooth portion 38b. Thus further inward movement of the insulation sheath 14 will be restrained, but the wire core 12 will be free to enter further into the housing and thus protrude from its sheath 14, the latter becoming compressed. Any increase in the overall diameter of the wire due to the compression of the sheath 14 is accommodated by the large clearance around the wire at the point of compression, including the clearance space 62. After the wire has been sufficiently inserted it will be released, the spring arm 38b will swing outwardly and downwardly, and its surface 38c will engage the barbed wire core 12 and press it downwardly against the terminal strip 42, and preferably into the channel 52, which serves as a supporting base for the wire core 12. It will be noted from FIG. 4 that the point at which the tooth surface 38c engages the wire core 12 is located rearwardly of the prong 60 and over the fixed post 56. Hence the wire core 12 is reliably and firmly pressed against the terminal strip 42 so as to make electrical connection therewith and its surface 38c will engage the barbed wire core 12 is firmly and rigidly supported at the point where it is engaged by the tooth surface 38c, so that it will be held in the receptacle in a firm and completely reliable manner.

The wire may be removed from the receptacle in any appropriate way. Since the wire-engaging tooth surface 38c is skewed, the wire may be unscrewed from the terminal in the manner disclosed in our aforementioned copending application, but other methods of release may be employed if desired.

The function of the elongated opening 8 is to positively guide the wire into the terminal and prevent such misalignment between the wire and the prong 60 as might result in a failure to make proper electrical connection or cause the prong to be bent. Since the prong 60 is fixed in position and rigidly mounted in the housing, this can be done even if the tip of the prong 60 is not visible, so long as the cross-sectional size of the aperture 8 is sufficiently closely comparable to that of the wire to be used with the terminal and the opening 8 is properly aligned with the prong 60. Proper alignment is achieved when the spacing between the prong 60 and the lower surface of the aperture 8 (as viewed in FIG. 4) is, as previously mentioned, for a single gauge terminal either closely comparable to or slightly greater than the thickness of the insulation on the wire to be used; and for a two gauge terminal slightly greater than the wire's insulation thickness.

The elongated nature of the aperture 8 is particularly effective in the case of a terminal designed to receive either of two closely similar sizes of wire. In such a situation the inner diameter of the opening 8 should provide just enough clearance with respect to the larger gauge insulating wire to be handled by the terminal as to permit that larger gauge wire to pass through the opening 8 without binding. The length of the opening 8 should be so chosen that, taking into account the spacing between the prong tip 60 and the inner end of the opening 8, when the smaller gauge insulated wire is passed through the collar at the maximum axial divergence thereof from the axis of the opening 8, proper engagement between the prong and the wire end will still result since once such proper engagement is made the prong 60 will itself ensure proper orientation of the wire relative to the terminal structure. For best results when the small gauge wire is inserted at its maximum upward angle of divergence the tip of the prong 60 should engage the end of a wire on the edge of the insulation sheath 14 only a short distance below the wire core 12, that distance preferably being less than half the thickness of the insulation. When the smaller gauge wire is inserted through the opening 8 at its most extreme downward angle the prong tip 60 should engage the tip of the wire core 12 at a point closely adjacent the junction between it and its insulation sheath 14. A more or less random movement of the wire, such as would occur if the wire is rotated slightly about its axis as it is inserted into the hole, will under the above circumstances move the end of the smaller gauge wire relative to the tip of the prong 60 sufficiently to permit the prong 60 to enter between the wire core 12 and the insulation sheath 14.

The length of the opening 8 for any given installation need not be defined with extreme precision. Any opening length will be suitable that will prevent the completely insulated smaller gauge wire from assuming an upward angular divergence from the axis of the opening 8 extreme enough to permit the wire to pass beyond the prong 60. The longer the opening 8, the more closely will it limit the extreme insertion angles of the smaller gauge wire, and hence the more satisfactorily will the terminal function, but there is, of course, a practical limit. Purely by way of example, for a terminal adapted to receive either the #12 and #14 gauges the minimum length of the opening 8 has been found to be approximately 3/16 of an inch.

If the length of the opening 8 is made short enough to permit a fully insulated wire to go completely over the prong, two serious malfunctions will occur: firstly, a wire can be caught and held in the terminal without making adequate electrical contact; and secondly, the wedging force exerted on the prong by such a wire can bend the prong down thereby ruining the terminal for further reuse.

While in the embodiment of FIGS. 1–4 it is the prong 60 and associated structure which is conductive and through which electrical connection is made to the wire, that is, of course, not essential. The tooth 38 could be used as the medium through which electrical connection is made, the prong 60 could be non-conductive while the strip base 50 was conductive, or the prong 60 could be conductive while the strip base 50 was non-conducitve. Other variations will suggest themselves. Similarly various types of wire engaging elements could be employed in place of the specifically disclosed teeth 38, some of which alternatives are disclosed in our aforementioned copending application.

Figure 5:
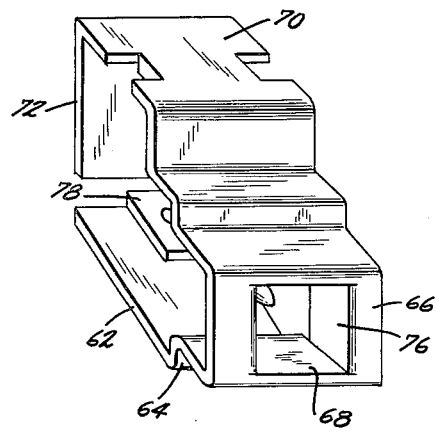
FIG. 5 is a three-quarter perspective view of another embodiment of the present invention.
Figure 7:
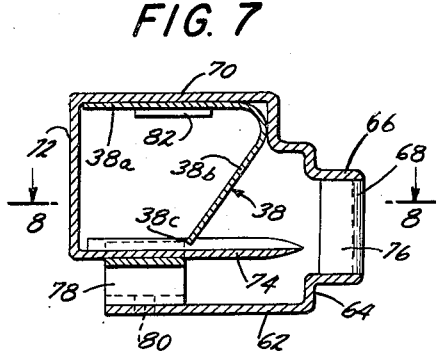
FIG. 7 is a cross sectional view taken along the line 7—7 of FIG. 6.
Figure 6:
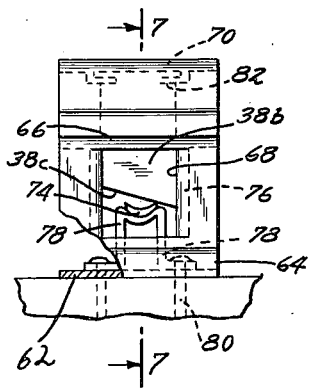
FIG. 6 is a front elevational view thereof, partially broken away and cross sectioned.
Figure 8:
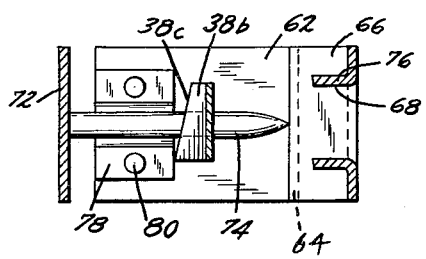
FIG. 8 is a cross sectional view taken along the line 8—8 of FIG. 7.

The embodiment of FIGS. 5–8 is of a simplified structure adapted for use where terminals need not be insulated, such as fuse boxes, panel boards, motor control systems, internal wiring in appliances, and the like. In that embodiment the terminal comprises a bottom wall 62, a front wall 64 having a forwardly projecting portion 66 in which an opening 68 is formed, a top wall 70, a rear wall 72 and a forwardly projecting narrow pointed element 74 having a concavo-convex cross section, all formed from a single sheet of metal, the element 74 projecting forwardly above the bottom wall 62 and terminating at a point rearwardly of the front wall 64 and hence inwardly from the opening 68 formed therein. The side walls of that opening 68 may be formed from flaps 76 bent inwardly from the projecting front wall portion 66 to define the opening 68. A bracket 78 is secured to the bottom wall 62 in any appropriate manner, as by means of rivets 80, that bracket supporting the forwardly extending element 74 against movement toward the bottom wall 62, the bracket 78 engaging the element 74 at a point somewhat rearwardly of its tip. A tooth 38 is mounted on the underside of the top wall 70, as by means of flaps 82 bent downwardly from that top wall, the wire engaging edge 38c of the tooth 38 being normally located slightly above the elements 74 at a point closely adjacent the supporting bracket 78. It will be seen that the terminal of FIGS. 5–8 functions in a manner similar to that of the terminals in the embodiment of FIGS. 1–4, the portion of the element 74 extending beyond the bracket 78 corresponding to the prong 60 and being substantially rigidly positioned by means of the bracket 78, the wire-engaging edge 38c of the tooth 38 being adapted to press the wire core against the element 74 at a point closely adjacent the rigid support 78 therefor, the opening 68, in conjunction with the forwardly extending portion 66, corresponding to the elongated wire-guiding opening 8.

While but a limited number of embodiments of the present invention have been here specifically disclosed, it will be apparent that many variations may be made therein, all within the scope of the instant invention as defined in the following claims.

We claim:

1. A terminal for insulated or stripped wire comprising a housing having an opening through which said wire is adapted to be inserted, a base rigidly mounted in said housing on which the core of said wire is adapted to rest, a prong extending out substantially rigidly from said base toward said opening in said housing, a part in said housing located radially beyond and rearwardly of the tip of said prong and adapted to engage, and function as a stop for, insulation on said wire core, said prong being adapted to engage the outer surface of the core of said wire, clearance being provided between said prong and said housing sufficient to freely receive the insulation on said wire, a tooth resiliently mounted in said housing above said base and prong, extending generally theretoward and inclined inwardly away from said opening in said housing, said tooth having a core biting surface normally located close to said base and adapted to engage said wire when said wire core is engaged by said prong and is on said base, thereby to retain said wire on said base.

2. The terminal of claim 1, in which said tooth is positioned so as to have its core biting surface engage said wire at a point substantially no farther outward than where said prong meets said base.

3. The terminal of claim 2, in which said housing comprises an outer wall toward which said prong extends, said opening through which said wire is adapted to pass being axially elongated and in said wall, the tip of said prong being located no farther outwardly than the outer end of said opening and being located above the lower surface of said opening by a distance substantially corresponding to the thickness of the insulation on the wire adapted to be used therewith.

4. The terminal of claim 2, in which said housing comprises an outer wall toward which said prong extends, said opening through which said wire is adapted to pass being axially elongated and in said wall, the tip of said prong being located no farther outwardly than the outer end of said opening and being located above the lower surface of said opening by a distance substantially coresponding to the thickness of the insulation on the wire adapted to be used therewith, the cross sectional size of said opening corresponding to a first size of insulated wire adapted to be used therewith, the axial length of said opening being such, in conjunction with the location of the tip of said prong relative thereto, that when an insulated wire of a somewhat smaller size than said first size is inserted through said opening in the most extreme inclined direction possible relative thereto the tip of said prong will engage the end of said wire core or the end of the insulation thereon adjacent said wire core depending on the direction of said inclination.

5. The terminal of claim 1, in which said housing comprises an outer wall toward which said prong extends, said opening through which said wire is adapted to pass being axially elongated and in said wall, the tip of said prong being located no farther outwardly than the outer end of said opening and being located above the lower surface of said opening by a distance substantially corresponding to the thickness of the insulation on the wire adapted to be used therewith.

6. The terminal of claim 1, in which said housing comprising an outer wall toward which said prong extends, said opening through which said wire is adapted to pass being axially elongated and in said wall, the tip of said prong being located no farther outwardly than the outer end of said opening and being located above the lower surface of said opening by a distance substantially coreponding to the thickness of the insulation on the wire adapted to be used therewith, the cross sectional size of said opening corresponding to a first size of insulated wire adapted to be used therewith, the axial length of said opening being such, in conjunction with the location of the tip of said prong relative thereto, that when an insulated wire of a somewhat smaller size than said first size is inserted through said opening in the most extreme inclined direction possible relative thereto the tip of said prong will engage the end of said wire core or the end of the insulation thereon adjacent said wire core depending on the direction of said inclination.

7. A terminal for insulated or stripped wire comprising connected walls including a bottom wall, a front wall having an opening therethrough through which insulated wire is adapted to be inserted, a top wall, a rear wall and a narrow pointed element extending forwardly from said rear wall above said bottom wall, registering with said opening, and having a tip located at a point inwardly positioned relative to said opening; a support extending up from said bottom wall engaging said element rearwardly of its tip, and supporting said element substantially rigidly in position; and a tooth secured to said top wall, resiliently mounted thereon, and inclined inwardly and downwardly toward said element, said tooth having a core biting surface normally located close to said pointed element and rearwardly of the tip thereof and adapted to engage said wire when said wire is positioned on said element, thereby to retain said wire on said element, said terminal including a part located radially beyond and rearwardly of the tip of said pointed element and adapted to engage, and function as a stop for, insulation on said wire core.

8. The terminal of claim 7, in which said tooth is positioned so as to have its core biting surface engage said wire at a point closely adjacent said support.

9. The terminal of claim 8, in which said front wall comprises a forward extension through which said opening is formed, the cross sectional size of said opening corresponding to a first size of insulated wire adapted to be used therewith, the axial length of said opening being such, in conjunction with the location of the tip of said prong relative thereto, that when a wire of a somewhat smaller size than said first size is inserted through said opening in the most extreme inclined direction possible relative thereto, the tip of said prong will engage the end of said wire core or the end of the insulation thereon adjacent said wire core depending on the direction of said inclination.

10. The terminal of claim 7, in which said front wall comprises a forward extension through which said opening is formed, the cross sectional size of said opening corresponding to a first size of insulated wire adapted to be used therewith, the axial length of said opening being such, in conjunction with the location of the tip of said prong relative thereto, that when an insulated wire of a somewhat smaller size than said first size is inserted through said opening in the most extreme inclined direction possible relative thereto the tip of said prong will engage the end of said wire core or the end of the insulation thereon adjacent said wire core depending on the direction of said inclination.

11. A terminal for insulated or stripped wire comprising connected walls including a bottom wall, a front wall having an opening therethrough through which a wire is adapted to be inserted, a top, a rear wall and a narrow pointed element extending forwardly from said rear wall above said bottom wall, registering with said opening, and having a tip located at a point inwardly positioned relative to said opening; a support extending up from said bottom wall engaging said element rearwardly of its tip, and supporting said element substantially rigidly in position; and a tooth secured to said top wall by inbent portions of said top wall, resiliently mounted thereon, and inclined inwardly and downwardly toward said element, said tooth having a core biting surface normally located close to said pointed element and rearwardly of the tip thereof and adapted to engage said wire when said wire is positioned on said element, thereby to retain said wire on said element, said terminal including a part located radially beyond and rearwardly of the tip of said pointed element and adapted to engage, and function as a stop for, insulation on said wire core.

12. The terminal of claim 11, in which said tooth is positioned so as to have its core biting surface engage said wire at a point closely adjacent said support.

13. The terminal of claim 12, in which said front wall comprises a forward extension through which said opening is formed, the cross sectional size of said opening corresponding to a first size of insulated wire adapted to be used therewith, the axial length of said opening being such, in conjunction with the location of the tip of said prong relative thereto, that when an insulated wire of a somewhat smaller size than said first size is inserted through said opening in the most extreme inclined direction possible relative thereto the tip of said prong will engage the end of said wire core or the end of the insulation thereon adjacent said wire core depending on the direction of said inclination.

14. The terminal of claim 11, in which said front wall comprises a forward extension through which said opening is formed, the cross sectional size of said opening corresponding to a first size of insulated wire adapted to be used therewith, the axial length of said opening being such, in conjunction with the location of the tip of said prong relative thereto, that when an insulated wire of a somewhat smaller size than said first size is inserted through said opening in the most extreme inclined direction possible relative thereto the tip of said prong will engage the end of said wire core or the end of the insulation thereon adjacent said wire core depending on the direction of said inclination.

15. The terminal of claim 7, in which said bottom wall, front wall, top wall, rear wall and element are formed from a single sheet of material.

16. The terminal of claim 9, in which said bottom wall, said front wall including its forward extension, said top wall, said rear wall, and said element are all formed from a single sheet of material.

17. The terminal of claim 11, in which said bottom wall, front wall, top wall, rear wall and element are formed from a single sheet of material.

18. The terminal of claim 13, in which said bottom wall, said front wall including its forward extension, said top wall, said rear wall, and said element are all formed from a single sheet of material.

References Cited in the file of this patent

UNITED STATES PATENTS

| | | |
|---|---|---|
| 2,675,531 | Sams et al. | Apr. 13, 1954 |
| 2,705,785 | Benander | Apr. 5, 1955 |
| 2,725,544 | Strange | Nov. 29, 1955 |
| 2,873,435 | Hubbell | Feb. 10, 1959 |